United States Patent
Nakayama et al.

(10) Patent No.: US 10,666,109 B2
(45) Date of Patent: May 26, 2020

(54) STATOR COIL, STATOR INCLUDING SAID STATOR COIL, AND ROTATING ELECTRIC MACHINE INCLUDING SAID STATOR

(71) Applicant: Hitachi Automotive Systems, Ltd., Hitachinaka-shi, Ibaraki (JP)

(72) Inventors: Kenichi Nakayama, Hitachinaka (JP); Tomohiro Fukuda, Hitachinaka (JP); Takashi Genmoto, Hitachinaka (JP); Hiromitsu Okamoto, Hitachinaka (JP); Mitsuaki Mirumachi, Hitachinaka (JP); Yutaka Matsunobu, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 89 days.

(21) Appl. No.: 15/755,010

(22) PCT Filed: Jul. 27, 2016

(86) PCT No.: PCT/JP2016/071941
§ 371 (c)(1),
(2) Date: Feb. 23, 2018

(87) PCT Pub. No.: WO2017/038310
PCT Pub. Date: Mar. 9, 2017

(65) Prior Publication Data
US 2019/0267861 A1    Aug. 29, 2019

(30) Foreign Application Priority Data
Sep. 2, 2015    (JP) .................... 2015-172452

(51) Int. Cl.
*H02K 3/12*    (2006.01)
*H02K 3/34*    (2006.01)
(Continued)

(52) U.S. Cl.
CPC .............. *H02K 3/345* (2013.01); *H02K 1/16* (2013.01); *H02K 3/12* (2013.01); *H02K 3/34* (2013.01);
(Continued)

(58) Field of Classification Search
CPC ............ H02K 5/225; H02K 3/12; H02K 3/28; H02K 3/50
See application file for complete search history.

(56) References Cited

U.S. PATENT DOCUMENTS 6,208,058 B1    3/2001    Taji et al.
8,384,258 B2 *    2/2013    Koike .................. H02K 3/12
310/260

(Continued)

FOREIGN PATENT DOCUMENTS

EP    2 660 956 A1    11/2013
JP    2001-037131 A    2/2001
(Continued)

OTHER PUBLICATIONS

Extended European Search Report issued in corresponding European Application No. 16841342.5, dated Mar. 18, 2019.

(Continued)

*Primary Examiner* — Dang D Le
(74) *Attorney, Agent, or Firm* — Foley & Lardner LLP

(57) ABSTRACT

The coil ends in a rotating electric machine are to be made smaller in size. A stator coil 60 inserted into a slot 420 in a stator of a rotating electric machine is formed with segment coils 28 connected to one another. In the stator coil 60, the segment coils 28 each include an insulating coated portion coated with an insulating coating, and a slit 900 or a recess is formed in the insulating coated portion of each of the segment coils 28 at a coil end 140. The slit 900 or the recess is preferably formed between a diagonal conductor portion (Continued)

28D and a conductor-end straight portion 28E of each segment coil 28.

9 Claims, 15 Drawing Sheets

(51) Int. Cl.
| | | |
|---|---|---|
| *H02K 1/16* | (2006.01) | |
| *H02K 5/20* | (2006.01) | |
| *H02K 7/00* | (2006.01) | |
| *H02K 9/193* | (2006.01) | |
| *H02K 21/14* | (2006.01) | |
| *H02K 3/38* | (2006.01) | |
| *H02K 15/00* | (2006.01) | |
| *H02K 15/04* | (2006.01) | |
| *B60K 6/26* | (2007.10) | |

(52) U.S. Cl.
CPC ............... *H02K 3/38* (2013.01); *H02K 5/20* (2013.01); *H02K 7/006* (2013.01); *H02K 9/193* (2013.01); *H02K 15/0081* (2013.01); *H02K 15/0421* (2013.01); *H02K 21/14* (2013.01); *B60K 6/26* (2013.01); *B60Y 2200/91* (2013.01); *B60Y 2200/92* (2013.01); *B60Y 2400/60* (2013.01)

(56) References Cited

U.S. PATENT DOCUMENTS

| | | |
|---|---|---|
| 2011/0181143 A1 | 7/2011 | Hasegawa et al. |
| 2014/0076498 A1 | 3/2014 | Sato |

FOREIGN PATENT DOCUMENTS

| | | |
|---|---|---|
| JP | 2011-151975 A | 8/2011 |
| JP | 2012-200101 A | 10/2012 |
| JP | 2013-094019 A | 5/2013 |
| JP | 2013-243849 A | 12/2013 |
| JP | 2014-007819 A | 1/2014 |
| JP | 2014-057450 A | 3/2014 |
| JP | 2014-060860 A | 4/2014 |
| JP | 2014-064384 A | 4/2014 |
| JP | 2014-128129 A | 7/2014 |
| JP | 2015-035866 A | 2/2015 |

OTHER PUBLICATIONS

International Search Report with English translation thereof and Written Opinion issued in corresponding application No. PCT/JP2016/071941 dated Nov. 15, 2016.

* cited by examiner

STATOR COIL, STATOR INCLUDING SAID STATOR COIL, AND ROTATING ELECTRIC MACHINE INCLUDING SAID STATOR

TECHNICAL FIELD

The present invention relates to a rotating electric machine, and more particularly, to a rotating electric machine that generates torque for running an automobile or generates electric power for braking.

BACKGROUND ART

In a rotating electric machine, AC power is supplied to stator windings, to generate a rotating magnetic field. A rotor is rotated by this rotating magnetic field. Also, the mechanical energy applied to the rotor can be converted into electric energy, and AC power can be output from coils. In this manner, the rotating electric machine functions as an electric motor or a generator. As the stator of such a rotating electric machine, there is a known structure in which terminals of segment coils are welded and connected (see PTL 1, for example).

Coils are wound around a stator manufactured in the above manner. A rotating electric machine supplies AC power to the coils, to cause the coils to generate a rotating magnetic field. The rotor is rotated by this rotating magnetic field. Also, in the rotating electric machine, the mechanical energy applied to the rotor is converted into electric energy, and AC power is output from the coils. That is, the rotating electric machine functions as an electric motor or a generator.

CITATION LIST

Patent Literature

PTL 1: JP 2011-151975 A

SUMMARY OF INVENTION

Technical Problem

In a case where rotating electric machines of this type are mounted in an automobile, the rotating electric machines are placed in a narrow, limited space, and therefore, such rotating electric machines are expected to become smaller in size. As the rotating electric machines become smaller, coil ends need to be made lower. In view of this, spaces between end coil portions need to be maintained in a stable manner. The problem lies in maintaining a stable insulation distance in the segment coils.

Solution to Problem

To solve the above problem, a structure disclosed in the claims is adopted, for example.

The present application discloses more than one means to solve the above problem. An example of the means is a stator coil inserted into a slot in a stator of a rotating electric machine. The stator coil is formed with segment coils connected to one another. The segment coils each include an insulating coated portion coated with an insulating coating, and a slit or a recess is formed in the insulating coated portion of each of the segment coils at a coil end.

Advantageous Effects of Invention

According to the present invention, coil ends can be made smaller in size.

The objects, structures, and effects other than the above will become apparent from the embodiments described below.

DESCRIPTION OF EMBODIMENTS

The following is a description of an embodiment of the present invention, with reference to the accompanying drawings.

A rotating electric machine according to this embodiment is a rotating electric machine suitable for use in driving of an automobile. Here, a so-called electric vehicle that uses a rotating electric machine may be a hybrid electric vehicle (HEV) that includes both an engine and a rotating electric machine, or a truly electric vehicle (EV) that runs only with a rotating electric machine and does not use an engine. The rotating electric machine described below can be used for both types, and therefore, the rotating electric machine described below is used in a hybrid automobile as a typical example.

Also, in the description below, the "axial direction" means the direction along the rotating shaft of the rotating electric machine. The circumferential direction is the direction along the direction of rotation of the rotating electric machine. The "radial direction" is the direction of the moving radius (radial direction), with the center being the rotating shaft of the rotating electric machine. The "inner circumferential side" is the inner side in the radial direction (the inner radial side), and the "outer circumferential side" is the opposite side or the outer side in the radial direction (the outer radial side).

Figure 1:
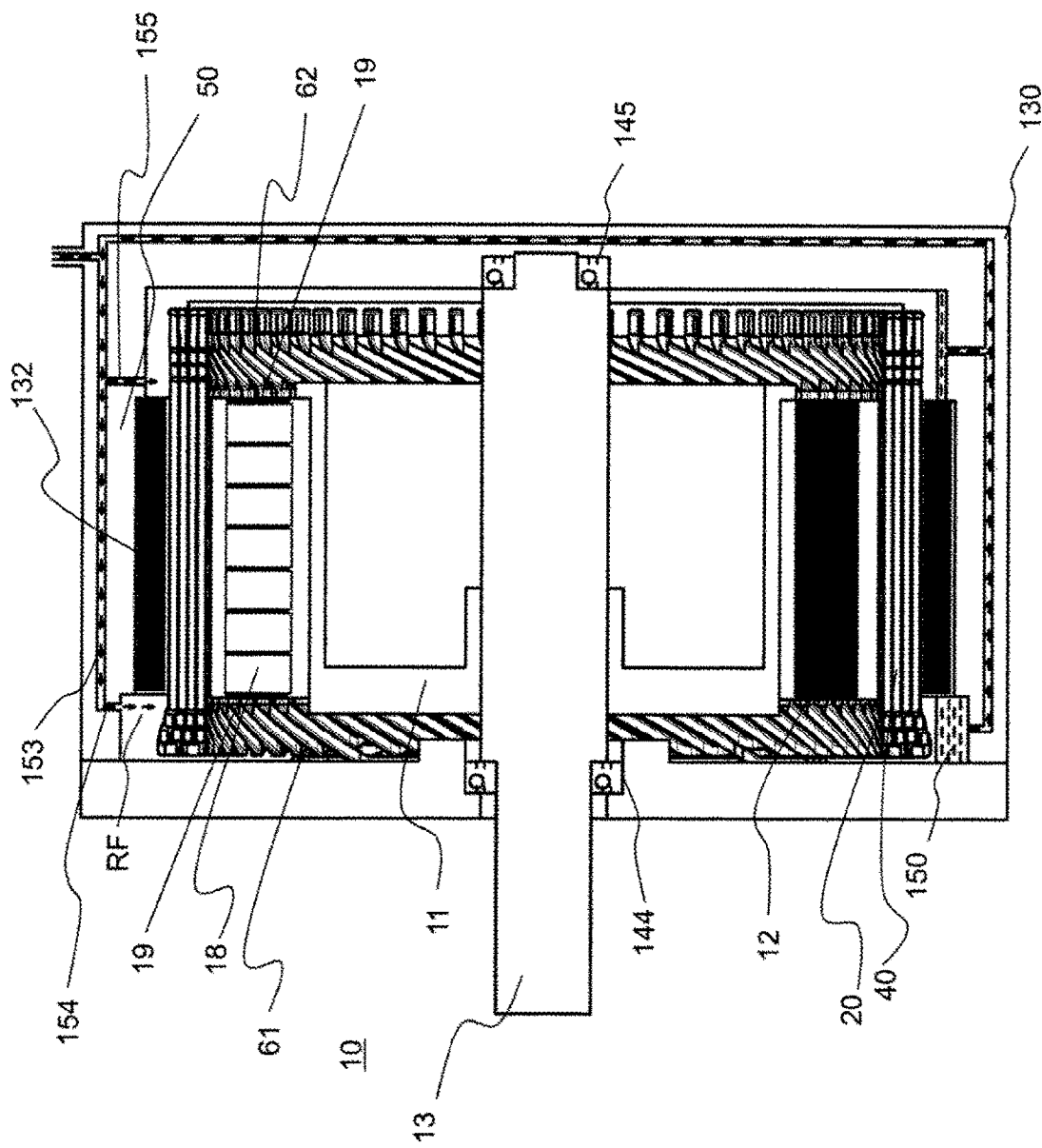
FIG. 1 is a schematic diagram showing the entire structure of a rotating electric machine.

FIG. 1 is a cross-sectional view of a rotating electric machine including a stator according to the present invention. The rotating electric machine 10 includes a housing 50, a stator 20, a stator core 132, stator coils 60, and a rotor 11.

The stator 20 is secured to the inner circumferential side of the housing 50. The rotor 11 is rotatably supported by the inner circumferential side of the stator 20. The housing 50 is shaped into a cylindrical form by cutting of a ferrous metal such as carbon steel, casting of cast steel or aluminum alloy, or stamping. The housing 50 forms the outer coating of the rotating electric machine. The housing 50 is also called a casing or a frame.

The housing 50 is shaped into a cylindrical form by drawing of a steel sheet (such as a high-strength steel sheet) of about to 5 mm in thickness. Flanges to be attached to a liquid-cooled jacket 130 are provided on the housing 50. The flanges protrude from the rim of an end face of the cylindrical housing 50 toward the outside in the radial direction. The flanges are formed by cutting of portions other than the flanges at the end portions formed at the time of drawing, and are integrally formed with the housing 50. Alternatively, the housing 50 may not be provided, and the stator 20 may be secured directly to the case.

The liquid-cooled jacket 130 is secured to the outer circumferential side of the housing 50. The inner circumferential wall of the liquid-cooled jacket 130 and the outer circumferential wall of the housing 50 constitute a refrigerant path 153 for a liquid refrigerant RF such as oil, and this refrigerant path 154 is designed not to cause any liquid leakage. The liquid-cooled jacket 130 houses bearings 144 and 145, and is also called a bearing bracket.

In the case of direct liquid cooling, the liquid as the refrigerant RF stored in a refrigerant (oil) storage space 150 passes through the refrigerant path 153, flows toward the stator 20 from refrigerant paths 154 and 155, and then cools the stator 20.

The stator 20 includes the stator core 132 and the stator coils 60. The stator core 132 is formed with stacked thin silicon steel sheets. The stator coils 60 are wound around a large number of slots 420 formed at the inner circumferential portion of the stator core 132. The heat generated from the stator coils 60 is transmitted to the liquid-cooled jacket 130 via the stator core 132, and is released by the refrigerant RF flowing in the liquid-cooled jacket 130.

The rotor 11 includes a rotor core 12 and a shaft 13. The rotor core 12 is formed with stacked thin silicon steel sheets. The shaft 13 is secured at the center of the rotor core 12. The shaft 13 is rotatably supported by the bearings 144 and 145 attached to the liquid-cooled jacket 130, and rotates in a predetermined position in the stator 20, the shaft 13 in the position facing the stator 20. Permanent magnets 18 and an end ring 19 are also provided in the rotor 11.

The rotating electric machine 10 is provided inside the liquid-cooled jacket 130 as shown in FIG. 1, and includes the housing 50, the stator 20 including the stator core 132 secured to the housing 50, and the rotor 11 rotatably provided in the stator. The liquid-cooled jacket 130 is formed with an engine case or a transmission case.

This rotating electric machine 10 is a permanent-magnet-containing three-phase synchronous motor. As a three-phase alternating current is supplied to the stator coils 60 wound around the stator core 132, the rotating electric machine 10 functions as an electric motor that rotates the rotor 11. When being driven by an engine, the rotating electric machine 10 also functions as a generator, and generates three-phase AC power. That is, the rotating electric machine 10 has both functions of an electric motor that generates rotating torque in accordance with electric energy and a generator that generates power in accordance with mechanical energy. The functions can be selectively used in accordance with a running condition of the automobile.

The stator 20 includes the cylindrical stator core 132 and the stator coils 60 mounted on the stator core 132.

Figure 3:
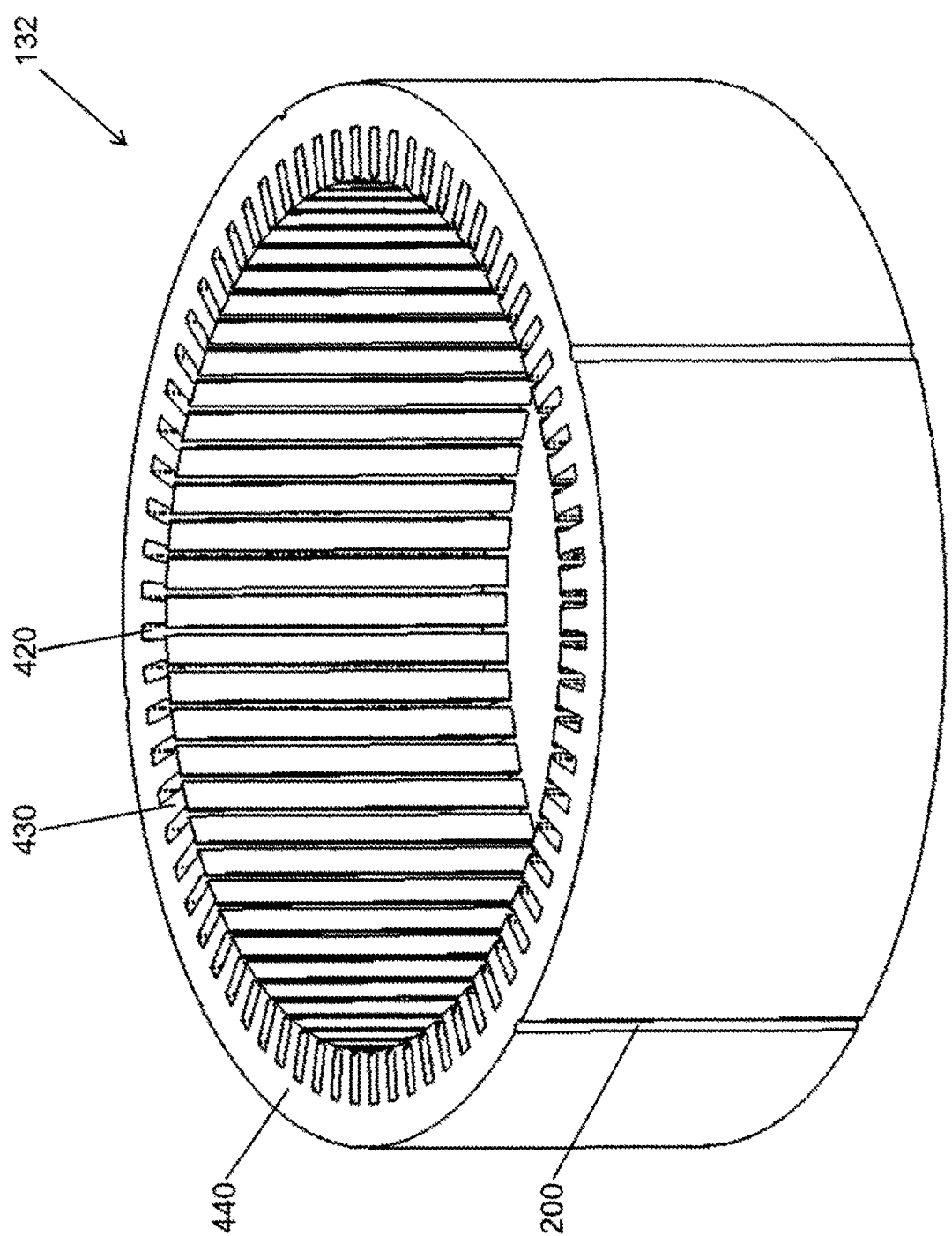
FIG. 3 is a perspective view of a stator core 132.
Figure 4:
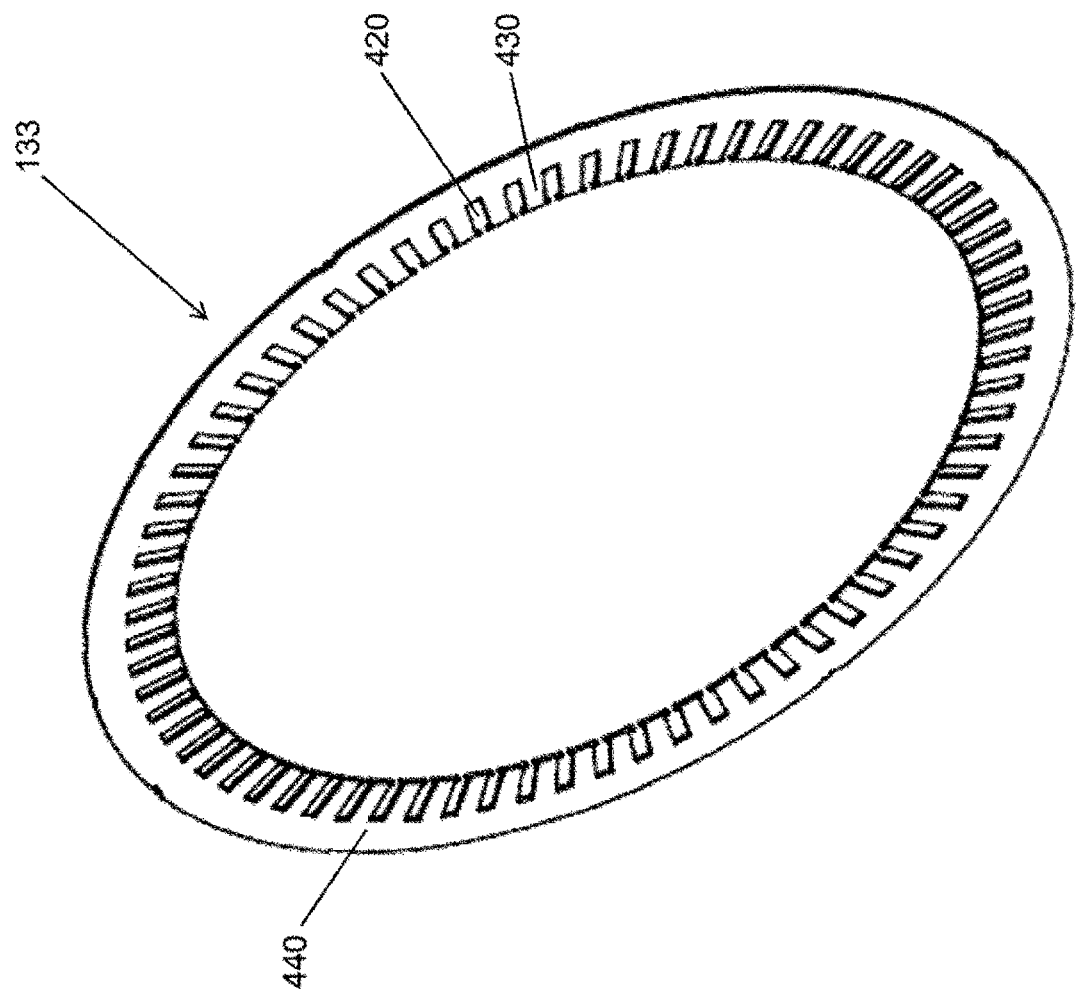
FIG. 4 is a diagram showing an electromagnetic steel sheet 133.
Figure 5:
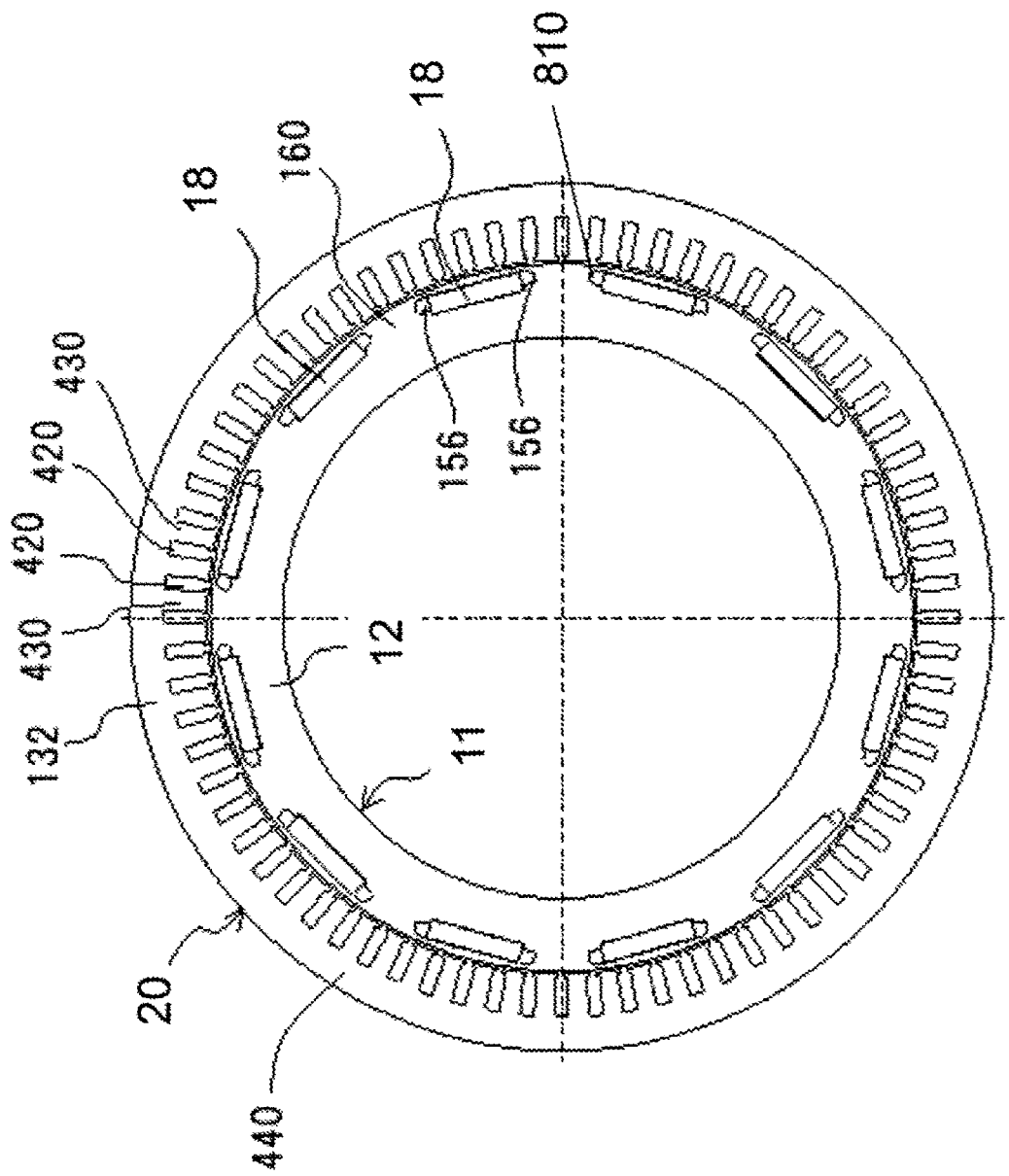
FIG. 5 is a diagram showing cross-sections of a rotor 11 and a stator 20.

Referring now to FIGS. 3 and 4, the stator core 132 is described. FIG. 3 is a perspective view of the stator core 132. FIG. 4 is a perspective view of an electromagnetic steel sheet 133 forming the stator core 132. As shown in FIG. 3, the stator core 132 is designed so that the slots 420 parallel to the axial direction of the stator core 132 are arranged at regular intervals in the circumferential direction.

The number of the slots 420 is 72 in this embodiment, for example, and the above described stator coils 60 are accommodated by the slots 420. An opening is formed on the inner circumferential side of each slot 420, and the width of the opening in the circumferential direction is substantially the same or slightly smaller than the coil mounting portion of each slot 420 on which the stator coils 60 are mounted.

Teeth 430 are formed between the slots 420, and each of the teeth 430 is integrally formed with a ring-like core back 440. That is, the stator core 132 is an integrated core formed by integrally shaping the teeth 430 and the core back 440.

The teeth 430 guide a rotating magnetic field generated by the stator coils 60 to the rotor 11, and function to cause the rotor 11 to generate rotating torque.

The stator core 132 is formed by molding electromagnetic steel sheets 133 of about 0.05 to 1.0 mm in thickness (see FIG. 4) through stamping, and stacking the molded ring-like electromagnetic steel sheets 133. Welded portions 200 are formed in the outer circumferential portion of the cylindrical stator core 132 by TIG welding or laser welding, and the welded portions 200 are parallel to the axial direction of the stator core 132. As shown in FIG. 4, the welded portions 200 are formed in semicircular weld grooves 20 formed beforehand in the outer circumferential portion of the stator core 132. Alternatively, no welded portions may be provided, and the stator core may be inserted directly into the case and be secured by swaging or the like.

The diagram shows cross-sections of the stator 20 and the rotor 11. In the rotor core 12, magnet insertion holes 810 into which rectangular magnets are to be inserted are formed at regular intervals, and a permanent magnet 18 is buried in each of the magnet insertion holes 810 and is secured by an adhesive, a powdered resin, a mold, or the like. The width of each magnet insertion hole 810 in the circumferential direction is greater than the width of each permanent magnet 18 in the circumferential direction, and magnetic voids 156 are formed on both sides of each permanent magnet 18. The magnetic voids 156 may be filled with an adhesive, or may be fixed integrally with the permanent magnets 18 by a molding resin. The permanent magnets 18 function to form field poles of the rotor 11. In this embodiment, one permanent magnet forms one magnetic pole. However, each magnetic pole may be formed with more than one magnet. As the number of permanent magnets 18 is increased, the magnetic flux density of each magnetic pole generated by the permanent magnets becomes higher, and magnetic torque can be increased.

The magnetization direction of the permanent magnets 18 is parallel to the radial direction, and the magnetization direction is reversed for each field pole. Specifically, where the stator-side face of a permanent magnet 18 for forming a certain magnetic pole is magnetized as the N-pole while the axis-side face thereof is magnetized as the S-pole, the stator-side face of a permanent magnet 18 forming an adjacent magnet pole is magnetized as the S-pole, and the axis-side face thereof is magnetized as the N-pole. These permanent magnets 18 are magnetized so that the magnetization direction is switched for each magnetic pole, and are arranged in the circumferential direction. In this embodiment, twelve permanent magnets 18 are arranged at regular intervals, and the rotor 11 forms twelve magnetic poles.

Here, neodymium- or samarium-based sintered magnets, ferrite magnets, neodymium-based bond magnets, or the like can be used as the permanent magnets 18.

In this embodiment, auxiliary magnetic poles 160 are formed between the permanent magnets 18 each forming a magnetic pole. The auxiliary magnetic poles 160 serve to lower the magnetic resistance of the q-axis magnetic flux generated by the stator coils 138. With the auxiliary magnetic poles 160, the magnetic resistance of the q-axis magnetic flux becomes much lower than the magnetic resistance of the d-axis magnetic flux. As a result, large reluctance torque is generated.

Figure 6:
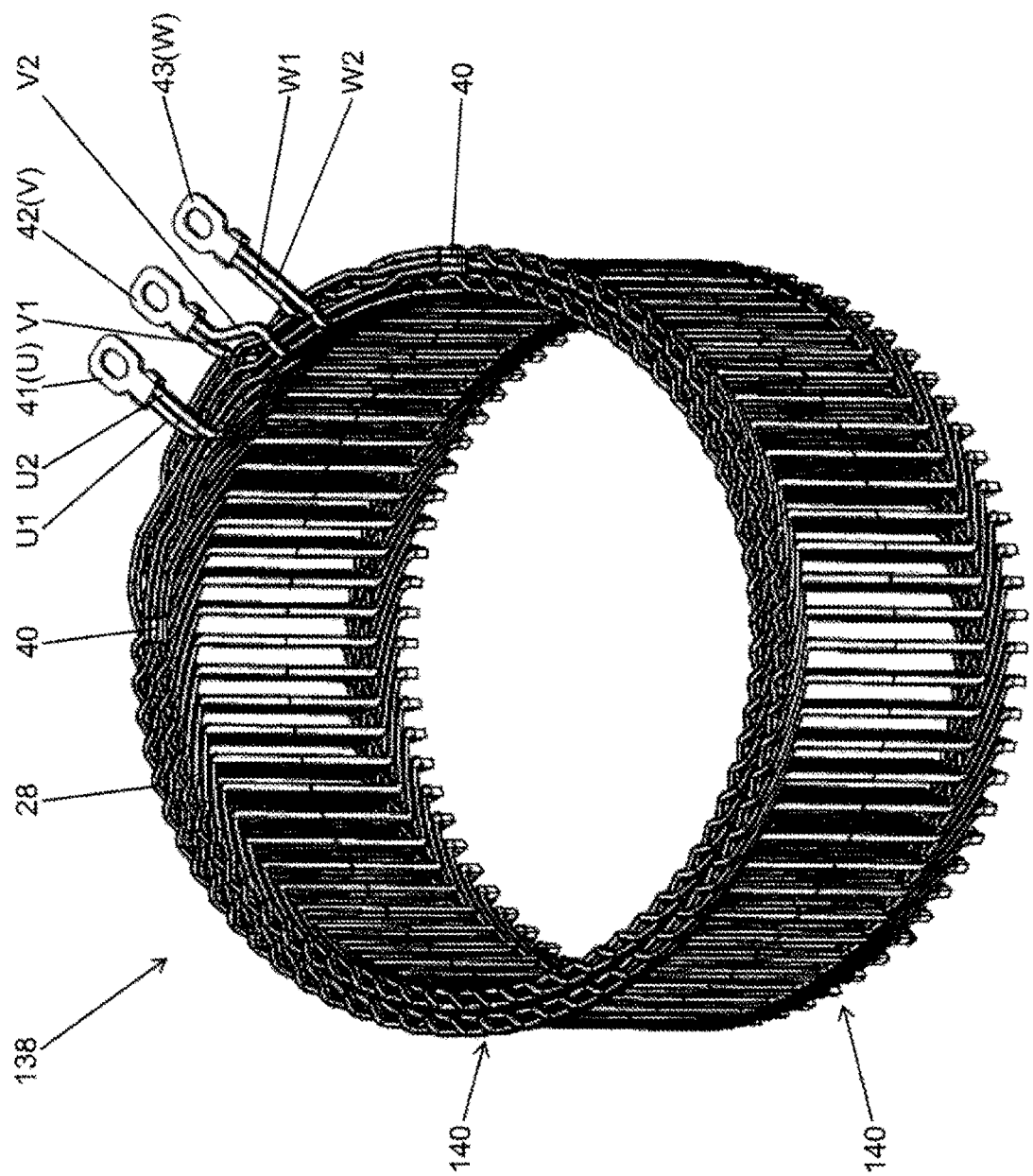
FIG. 6 is a perspective view of stator coils 138.
Figure 7:
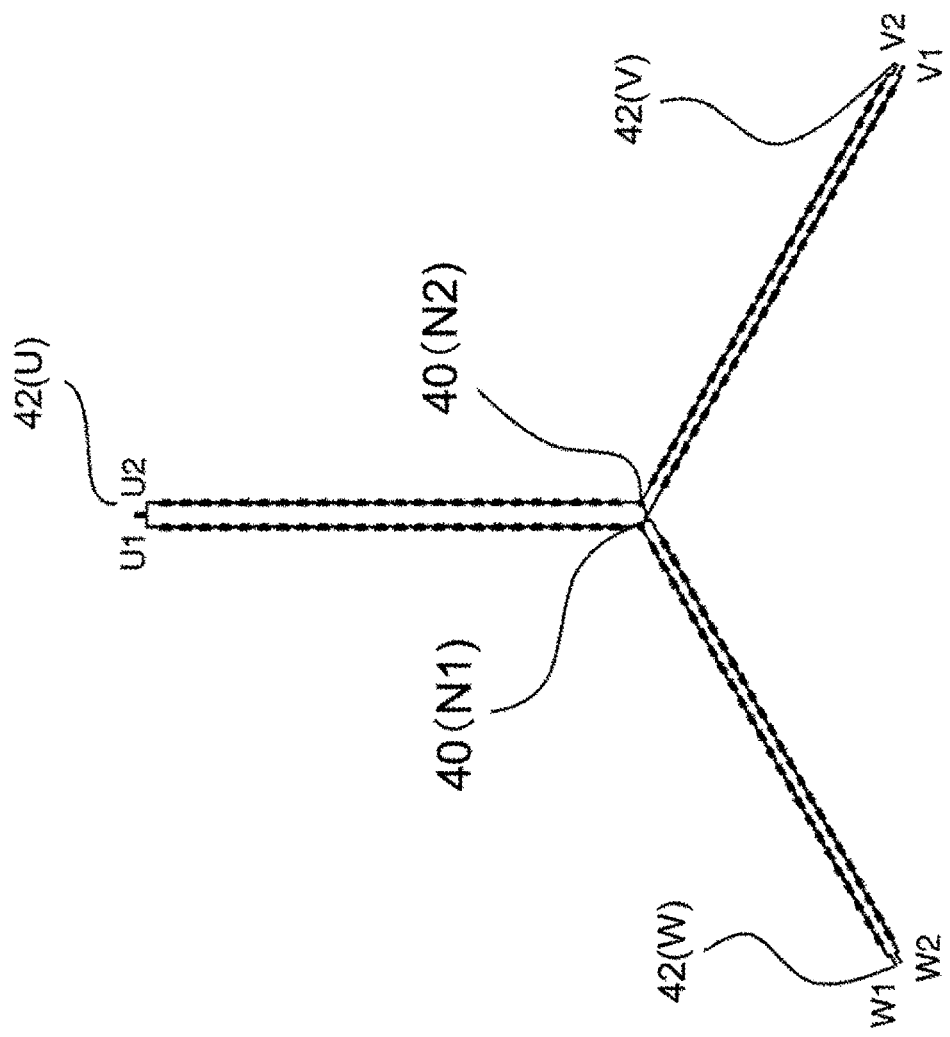
FIG. 7 is a diagram showing star connections.

Referring now to FIG. 2 and FIGS. 6 through 8, the stator coils 60 are described. FIG. 6 is a perspective view of the stator coils 60 of three phases. FIG. 7 is a diagram showing star connections.

Figure 9:
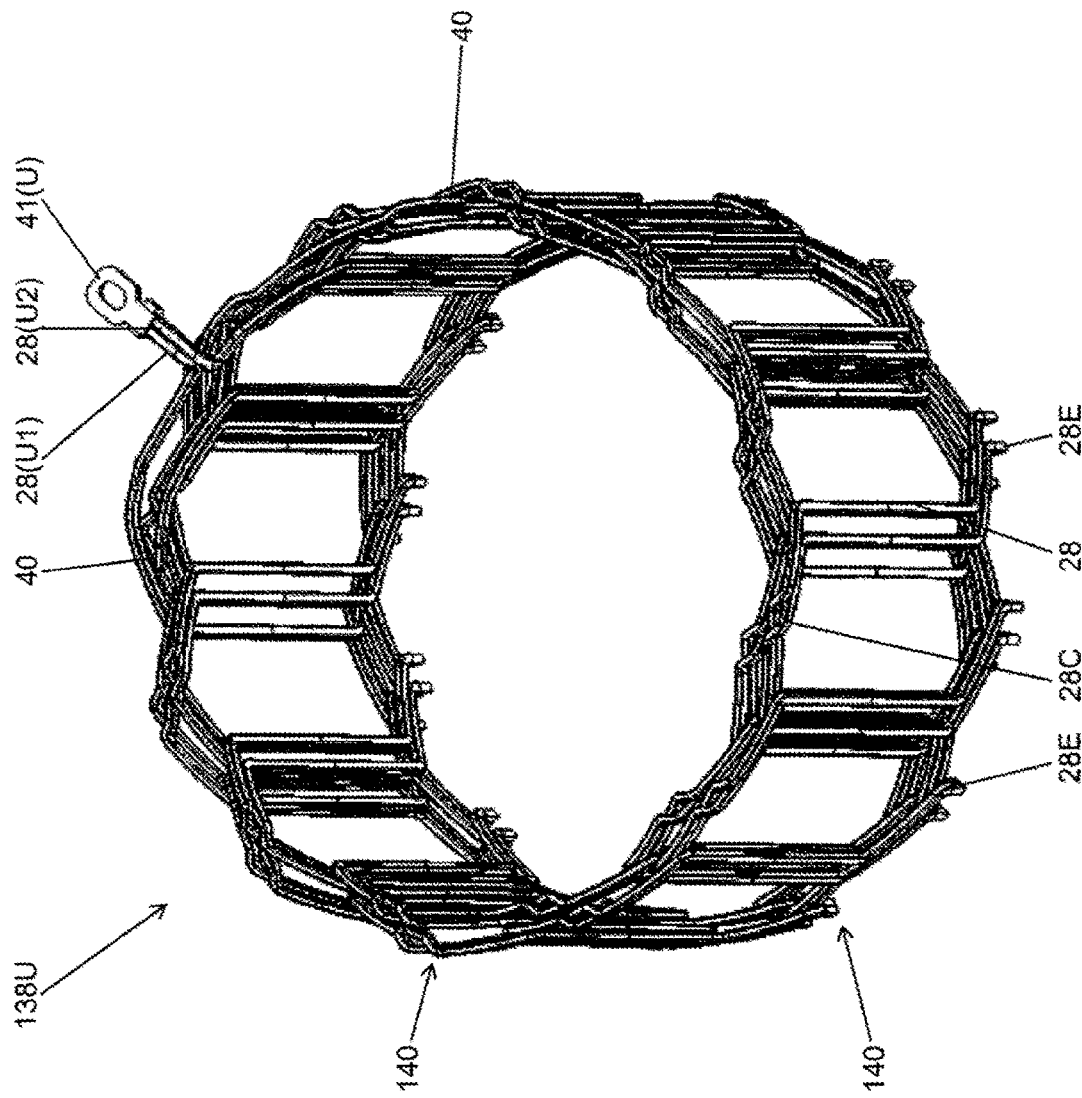
FIG. 9 is a perspective view of a stator coil 138U.
Figure 10:
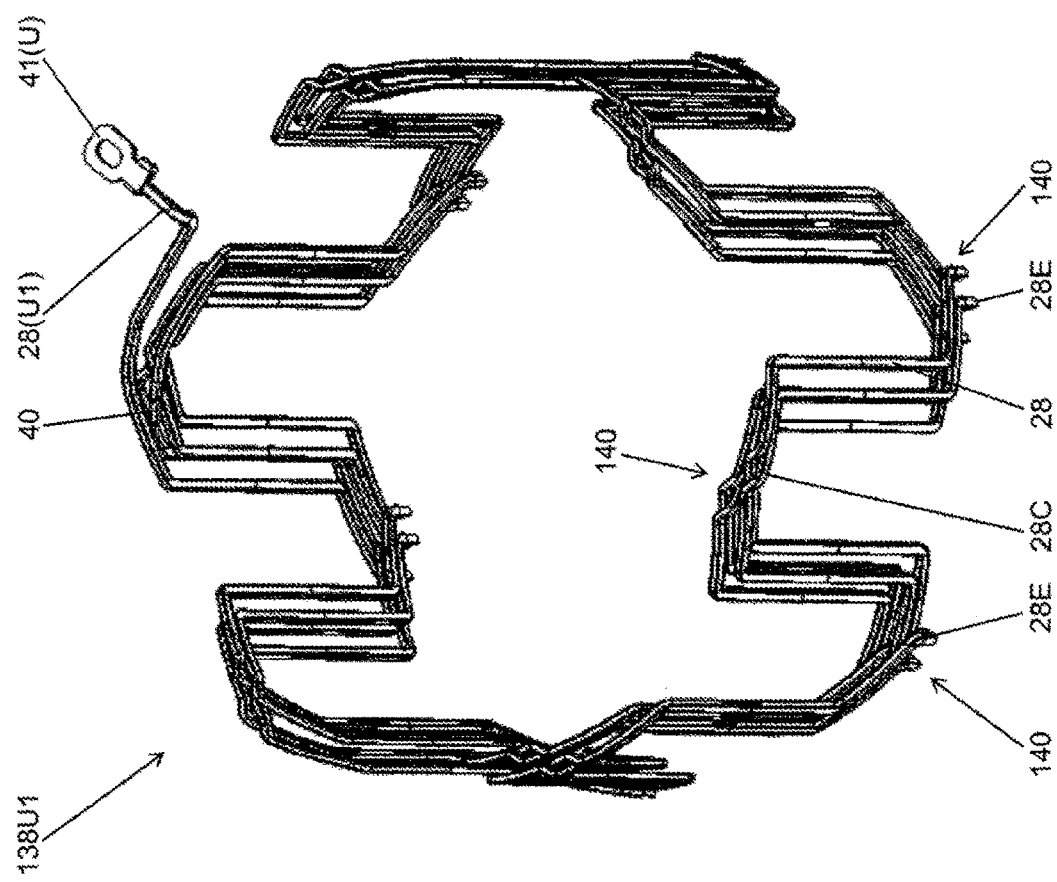
FIG. 10 is a perspective view of a stator coil 138U1.
Figure 11:
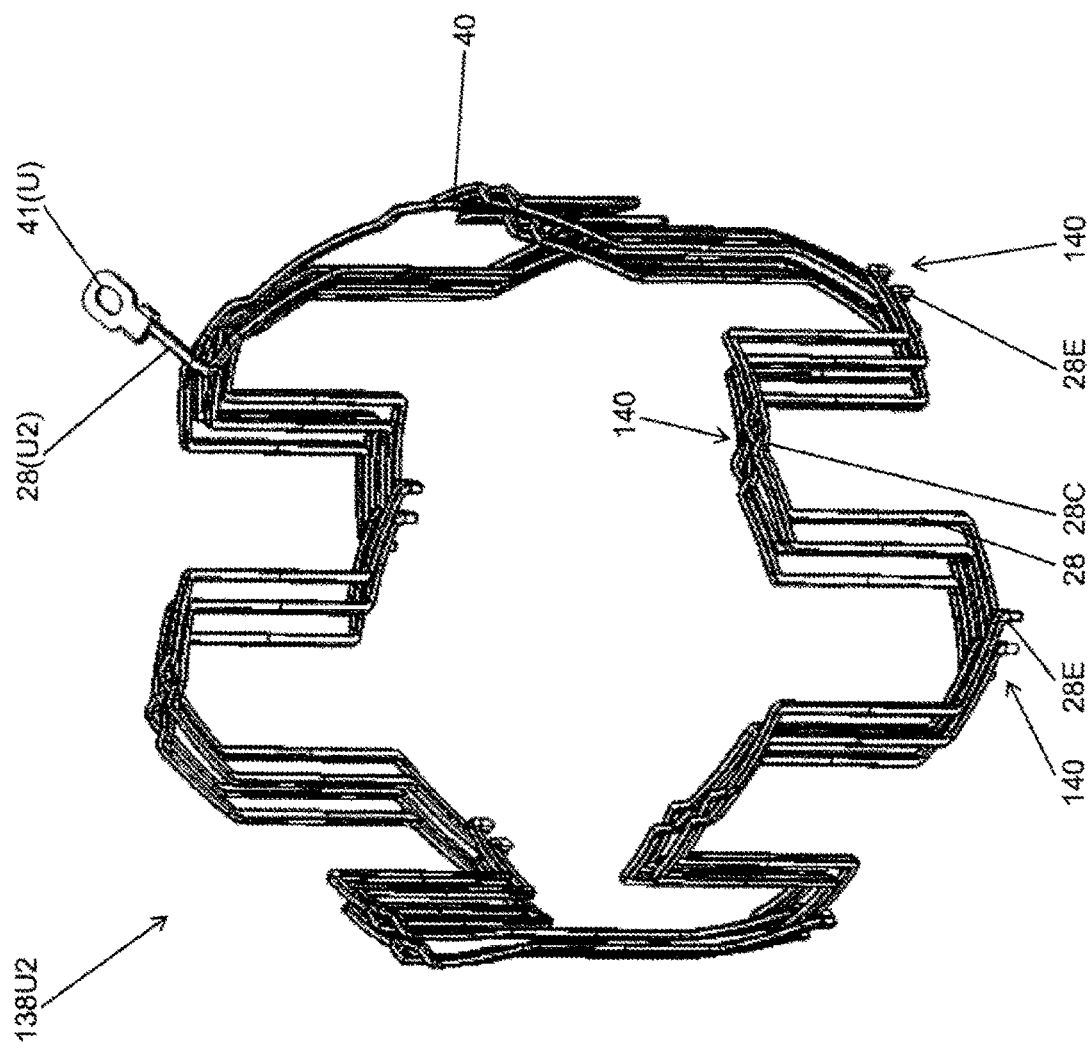
FIG. 11 is a perspective view of a stator coil 138U2.

FIGS. 9, 10, and 11 are perspective views of the stator coil 60 of a U-phase, the stator coil 60 of a U1-phase, and the stator coil 60 of a U2-phase that are wound around the stator core 132.

Stator coils 138 are connected by a star connection structure shown in FIG. 7. In this embodiment, stator coils 138 with a two-star structure in which two star connections are connected in parallel are adopted. Specifically, the structure includes star connections of a U1-phase, a V1-phase, and a W1-phase, and star connections of a U2-phase, a V2-phase, and a W2-phase. The lead wires of the U1- and U2-phases are combined into one by an AC terminal 41U, the lead wires of the V1- and V2-phases are combined into one by an AC terminal 41V, and the lead wires of the W1- and W2-phases are combined into one by an AC terminal 41W. N1 and N2 represent the neutral points of the respective star connections.

The stator coils 60 are wound by a distributed winding method, and are connected by a star connection structure. Distributed winding is a winding method by which a phase winding is wound around the stator core 132 so that the phase winding is housed in two slots 420 between which more than one slot 420 exists. In this embodiment, distributed winding is adopted as the winding method. Therefore, the magnetic flux distribution to be formed is closer to sinusoidal waves than that with concentrated winding, and reluctance torque is easily generated. Accordingly, in this rotating electric machine 10, the controllability of control using field-weakening control and reluctance torque becomes higher. Thus, the rotating electric machine 10 can be used in a wide rotating speed range from a low rotating speed to a high rotating speed, and excellent motor characteristics suitable for electric vehicles can be achieved.

The stator coils 60 form star-connected phase coils of three phases, and may have a circular or rectangular cross-section. However, the cross-section in each slot 420 should be used as effectively as possible, and the spaces in the slots should be minimized, to achieve higher efficiency.

Therefore, a rectangular cross-section is preferable in achieving higher efficiency. It should be noted that the rectangular cross-section of each stator coil 60 may be short in the circumferential direction and be long in the radial direction of the stator core 132. Alternatively, the rectangular cross-section may be long in the circumferential direction and be short in the radial direction of the stator core 132.

In this embodiment, rectangular wires are used as the stator coils 60 so that a rectangular cross-section of the stator coil 60 in each slot 420 is long in the circumferential direction of the stator core 132 and is short in the radial direction of the stator core 132. The outer circumferences of the rectangular wires are coated with an insulating coating.

An oxygen-free copper or an oxygen-containing copper is used as the stator coils 138. In the case of an oxygen-containing copper, the oxygen content is about 10 to 1000 ppm.

As shown in FIG. 8(a), a segment coil 28 having a U-shape is formed so that a bent point is located at a vertex 28C of a non-welding-side coil end 61. Here, the vertex 28C of the non-welding-side coil end 61 should have such a shape that the direction of the conductor is reversed in the U-shape.

Figure 8:
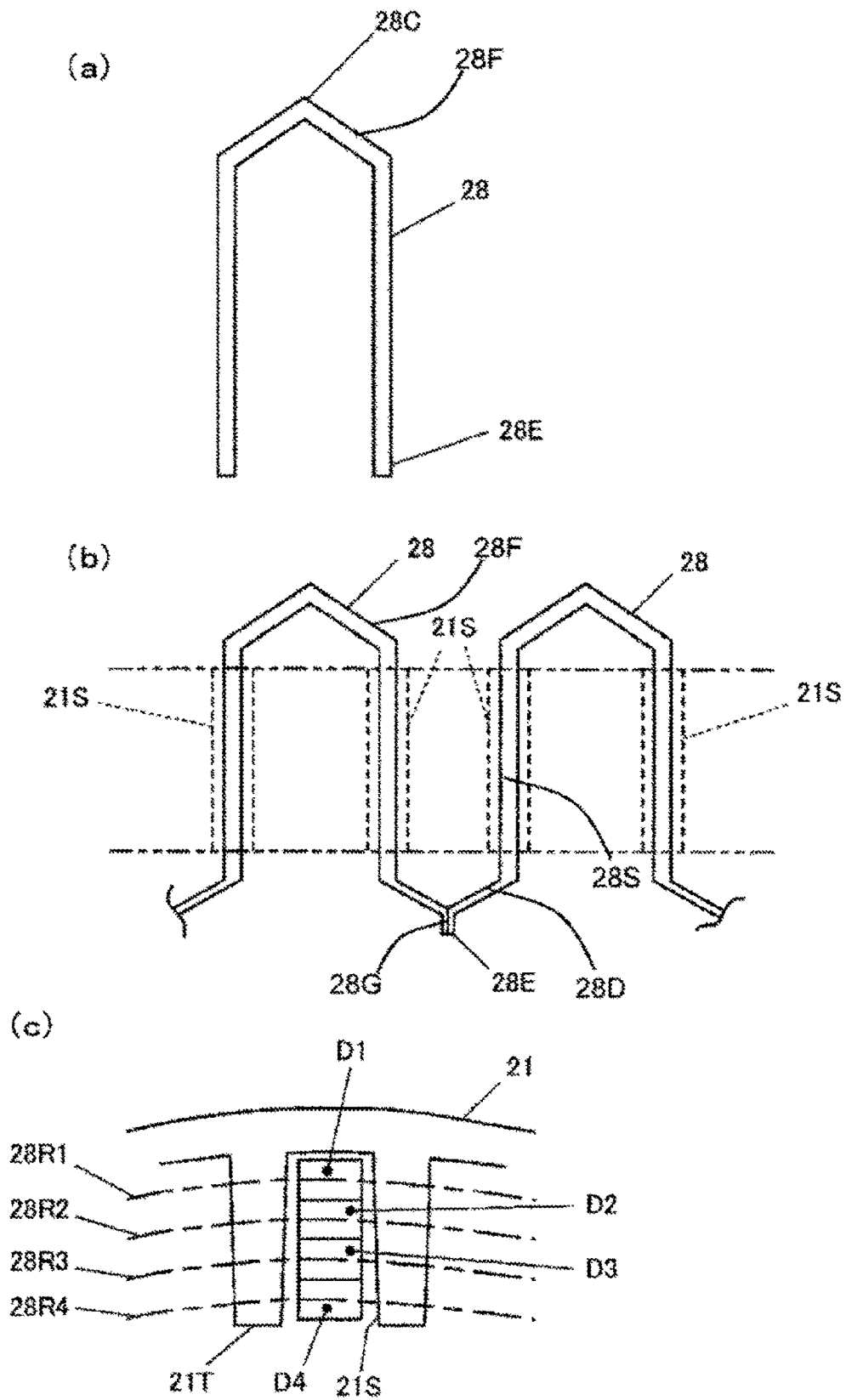
FIG. 8 is a diagram for explaining segment coils of stator coils: (a) is a diagram showing a segment coil; (b) is a diagram for explaining coil formation with segment coils; and (c) is a diagram for explaining arrangement of segment coils in slots.

Specifically, when viewed from the radial direction, the vertex 28C of the non-welding-side coil end 61 and diagonal conductor portions 28F of the non-welding-side coil end 61 do not necessarily form a triangular shape as in FIG. 8. For example, at part of the vertex 28C of the non-welding-side coil end 61, such a shape may be formed that the conductor may be substantially parallel to the end face of the stator core 132 (such a shape that the vertex 28C of the non-welding-side coil end 61 and the diagonal conductor portions 28F of the non-welding-side coil end 61 form substantially a trapezoidal shape when viewed from the radial direction).

The segment coil 28 is inserted into stator slots 420 from the axial direction. At a conductor end portion 28E, the segment coil 28 is then connected (by welding or the like) to another segment coil 28 inserted at a distance equivalent to a predetermined number of slots 420 as shown in FIG. 8(b).

In this stage, straight conductor portions 28S that are the portions inserted into slots 420, and diagonal conductor portions 28D that are portions diagonally extending to the conductor-end straight portions 28G of the segment coils 28 to which the segment coil 28 is connected are formed (the diagonal conductor portions 28D and the conductor-end straight portions 28G are formed by bending) in the segment coil 28. The conductor-end straight portions 28G are straight portions existing between the diagonal conductor portions 28D and the conductor end portions 28E.

Two, four, six, . . . (a multiple of 2) of segment coils 28 are inserted into a slot 420. FIG. 3(c) shows an example where four segment coils 28 are inserted into one slot 420. Since the conductor has a substantially rectangular cross-section, the occupied area in each slot 420 can be increased, and the efficiency of the rotating electric machine 10 becomes higher.

FIG. 9 is a diagram showing a case where the connecting process shown in FIG. 3(b) is repeated until the segment coils 28 form a ring, and a coil of one phase (a U-phase, for example) is formed. The coil of one phase is designed so that the conductor end portions 28E are located on one side in the axial direction, and a welding-side coil end 62 at which the conductor end portions 28E are located, and the non-welding-side coil end 61 are formed. In the coil of one phase, the terminal of each phase (a terminal 42U of the U-phase in the examples in FIGS. 10 and 11) are formed at one end, and a neutral wire 41 is formed at the other end. The diagram shows a connecting portion 800 of a segment coil. In this embodiment, there are 144 connecting portions 800. The connecting portions are arranged at an appropriate distance from one another. The connecting method is TIG welding of arc welding, plasma welding, or the like. The connection is performed by melting the base material of copper wires. Argon, helium, a mixture of argon and helium, or the like is used as the shield gas.

As shown in FIG. 6, the stator coils 60 are formed with a total of six sets (U1, U2, V1, V2, W1, and W2) of coils adhering tightly to the stator core 132. The six sets of coils constituting the stator coils 60 are arranged at an appropriate distance from one another with the slots 420.

AC terminals 41(U), 42(V), and 43(W) that are input/output coil conductors of the respective stator coils 60 of the U-, V-, and W phases, and neutral-point connecting conductors 40 are drawn to one coil end 140 of the stator coils 60.

It should be noted that, to improve the working efficiency in assembling the rotating electric machine 10, the AC terminals 41(U), 42(V), and 43(W) for receiving three-phase AC power are arranged to protrude from the coil end 140 to the outside in the axial direction of the stator core 132. The stator 20 is then connected to a power inverter (not shown) via the AC terminals 41(U), 42(V), and 43(W), so that AC power is supplied.

Figure 2:
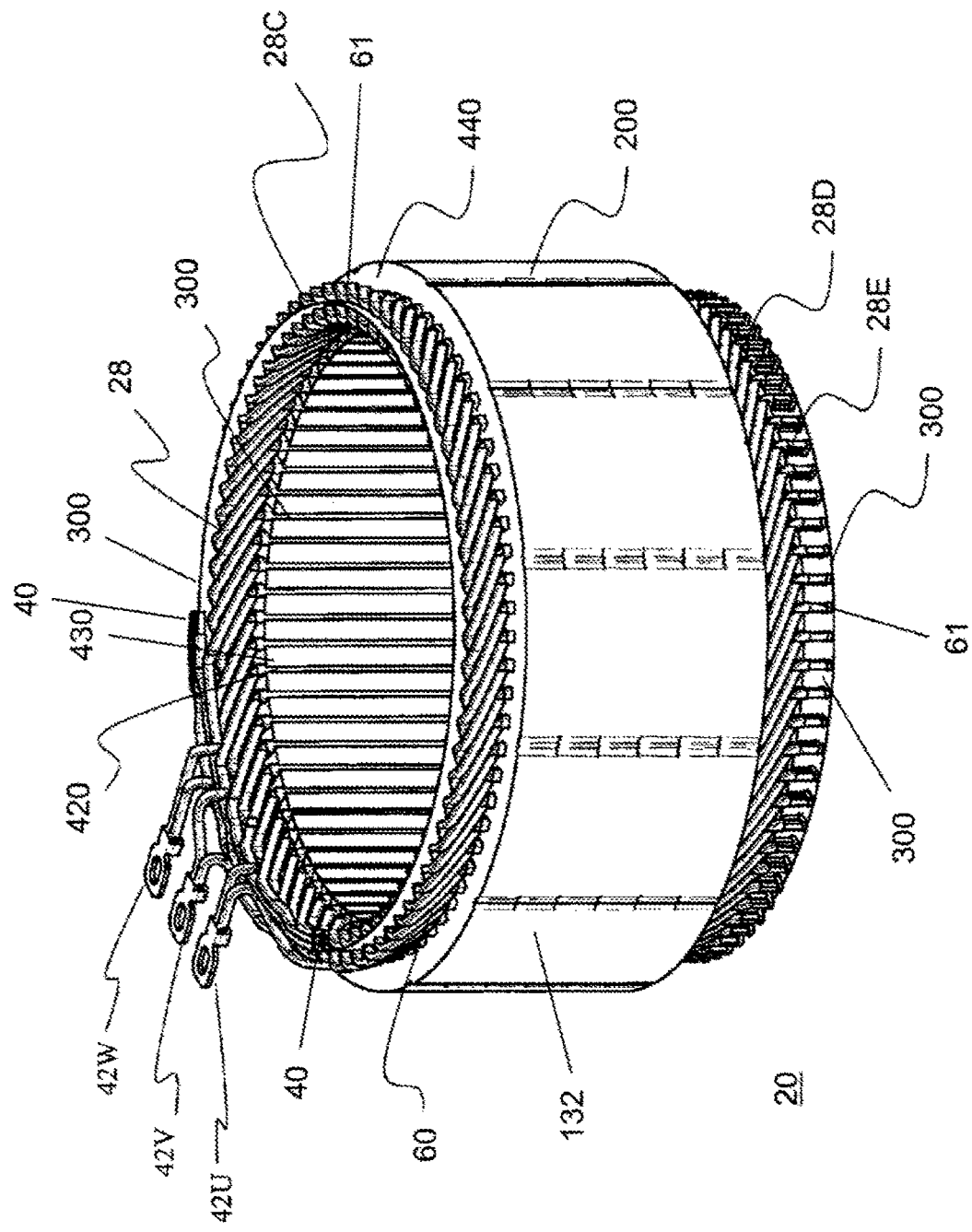
FIG. 2 is a perspective view of a stator of the rotating electric machine.

As shown in FIG. 2, of the stator coils 60, the coil ends 140 that protrude from the stator core 132 to the outside in the axial direction have crossover wires arranged thereon, so that the coil ends 140 are neatly arranged, leading to a reduction in the size of the entire rotating electric machine 10. As the coil ends 140 are preferably neatly arranged, reliability in insulating characteristics can also be increased.

The stator coils 60 are designed so that the outer circumferences of the conductors are coated with an insulating coating, and thus, electric insulation is maintained. However, insulating paper 300 (see FIG. 2) is preferably provided in addition to the insulating coating, so that the withstand voltage is maintained, and even higher reliability can be achieved.

The insulating paper 300 is provided in the slots 420 and at the coil ends 140. The insulating paper 300 (so-called slot liners 310) provided in the slots 420 is provided between the segment coils 28 inserted in the slots 420 and between the segment coils 28 and the inner faces of the slots 420, to increase the withstand voltage between the segment coils and between the segment coils 28 and the inner faces of the slots 420.

The insulating paper 300 provided at the coil ends 140 is provided in a ring-like form between the segment coils, to insulate the coil ends 140 from each other and insulate the conductors from one another. The insulating paper 300 also serves as a holding member that prevents dripping of a resin member (such as polyester or liquid epoxy varnish) dropped on the entire or part of the stator coils.

As described above, in the rotating electric machine 10 according to this embodiment, the insulating paper 300 is provided in the slots 420 and at the coil ends 140. Thus, the necessary withstand voltage can be maintained, even if the insulating coating is damaged or deteriorates. It should be noted that the insulating paper 300 is an insulating sheet made of heat-resistant polyamide paper, and is about 0.1 to 0.5 mm in thickness.

Figure 12:
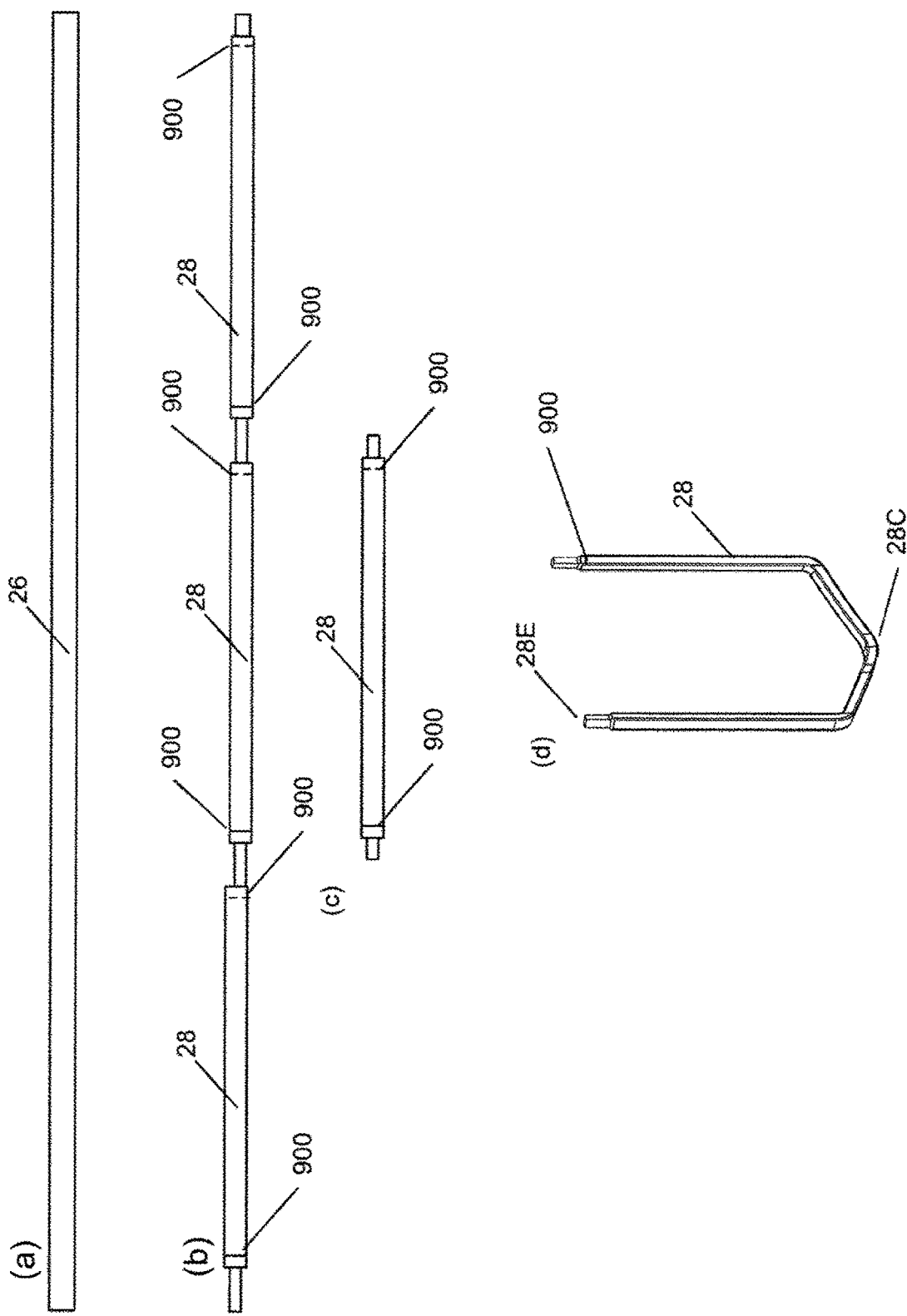
FIG. 12 is a diagram for explaining segment coils 28 of stator coils 138: (a) is a diagram showing segment coils 28 prior to shaping; (b) is a diagram for explaining detachment of the insulating coating and slits 900 of segment coils 28 prior to shaping; (c) is a diagram showing a segment coil 28 prior to shaping; and (d) is a diagram for explaining positioning of a segment coil 28 after shaping.

FIG. 12 is a diagram for explaining segment coils of stator coils: (a) is a diagram showing segment coils prior to shaping; (b) is a diagram for explaining detachment of the insulating coating and slits of segment coils prior to shaping; (c) is a diagram showing a segment coil prior to shaping; and (d) is a diagram for explaining positioning of a segment coil after shaping.

In (b), enamel detachment is performed on straight coils prior to shaping of segment coils.

In the detachment of the insulating enamel coating, a release mold, a grinder, a solvent, or the like may be used. In this case, a release mold is used. When a release mold is used, slots 900 are formed in the insulating coating. The slits 900 are used as the hook portions for the shaping jigs when the conductor-end straight portions 28G are shaped. Alternatively, the slits 900 may be formed in the insulating coating in a different stage.

The slits 900 may be formed in either face of the insulating coating. However, the slits 900 are preferably formed in the face that is to be used as the jig contact face at the time of coil formation in a later stage. The slits 900 are formed at about 1 to 2 mm from the enamel detachment portions. (c) shows the shape of a coil that has the slit 900 and has been shaped into a U-shaped segment coil 28.

Figure 13:
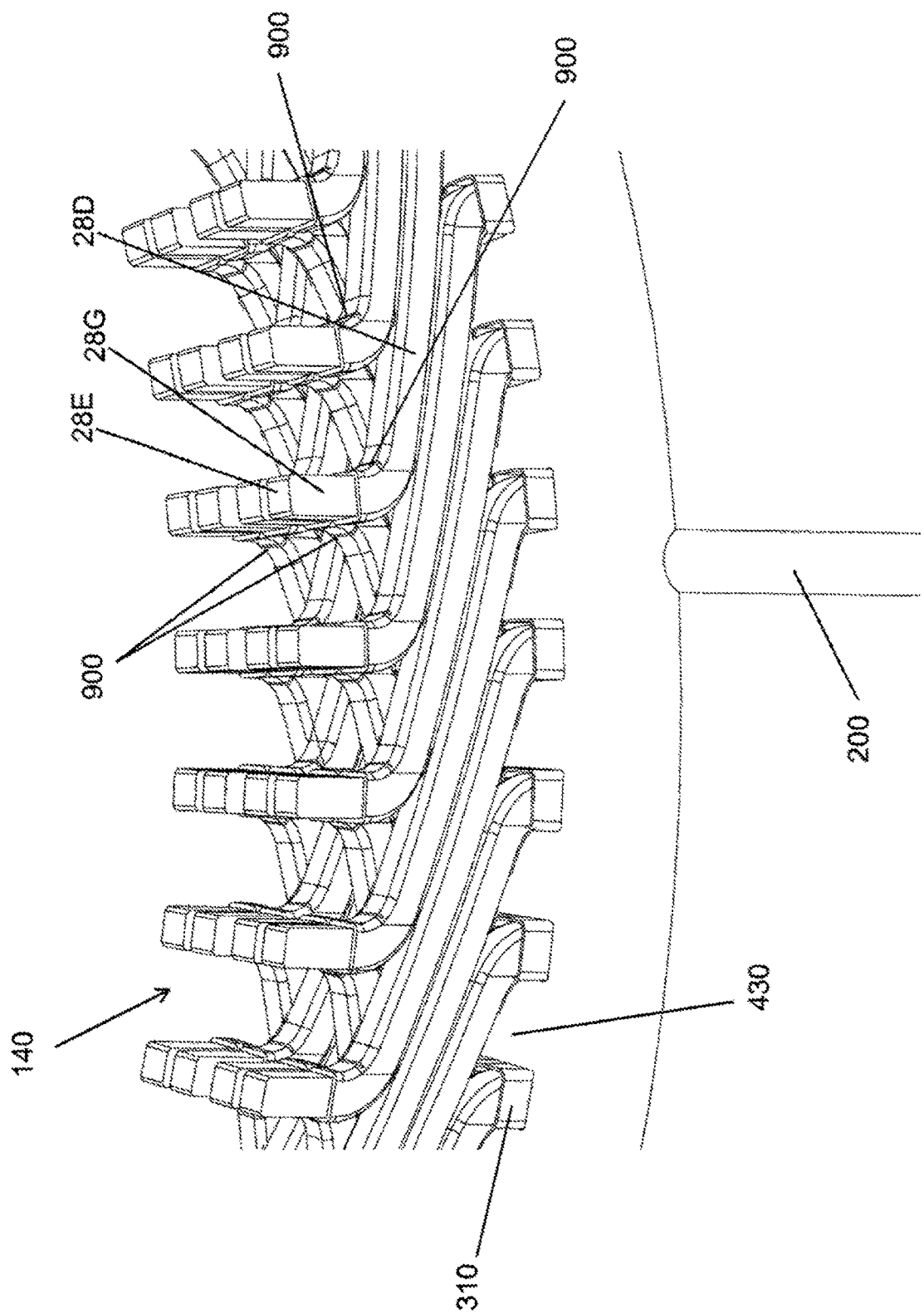
FIG. 13 is a diagram showing the positional relationship between coils after coil shaping in a case where the slits 900 are formed.

FIG. 13 shows the positional relationship between coils after coil shaping in a case where the slits 900 are formed. As the coil shaping is performed with the slits 900, the positional relationship between the coils prior to welding becomes stable. The slits 900 are used as the hook portions or the contact portions for the shaping jigs. That is, in the coil ends 140 after shaping, the slits 900 are located between the diagonal conductor portions 28D and the conductor-end straight portions 28G.

Further, the coil height in the axial direction becomes stable. Accordingly, the connecting process in a later stage becomes easier, and productivity becomes higher. Since the slits 900 are formed only in one face of each segment coil (preferably in the face on the end portion side in the axial direction after the shaping), and therefore, the slits 900 do not affect insulation properties. The insulation distance for the diagonal conductor portions 28D is maintained at about 0.2 to 1.0 mm. Further, the diagonal conductor portions 28D are also arranged at regular intervals. Thus, the insulation properties are also improved.

Each slit 900 may be a slit in the shape of a long hole or a circular hole. The slits 900 are shaped in conformity with the shape of the coil shaping jigs. If a slit is formed along an entire side of the insulating coating of each coil, the insulating coating might come off. Therefore, each slit 900 may be formed at part of one side. Further, the height after the coil shaping becomes stable. Thus, the cutting process for adjusting the coil height prior to welding can be skipped.

Figure 14:
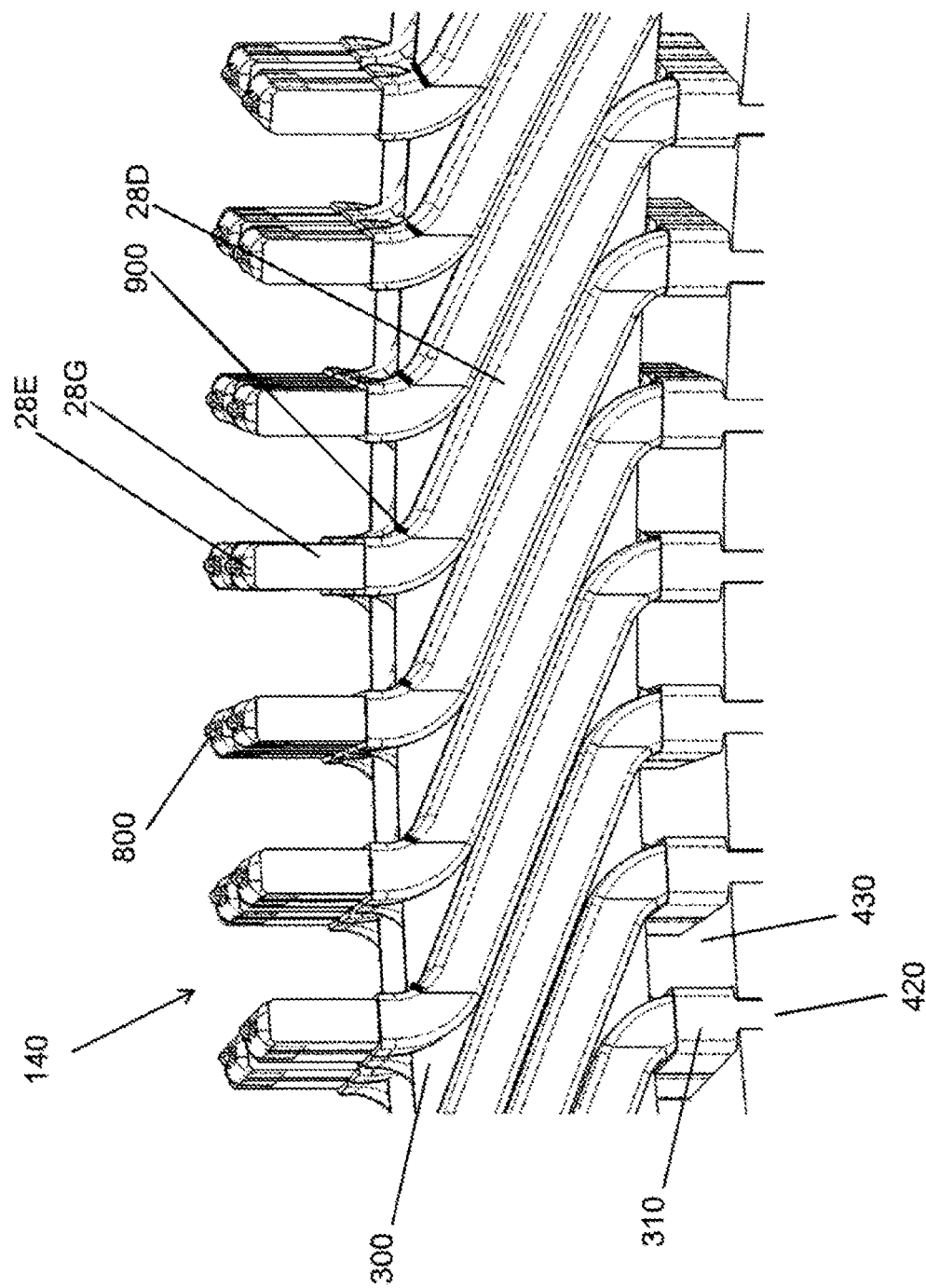
FIG. 14 is a perspective view of a coil end 140.

FIG. 14 is a perspective view of a coil end after connection. As the coil end height prior to welding becomes stable, the height after the welding is also stable, and accordingly, the coil end height can be small. Further, adjustment prior to the welding also becomes unnecessary. Accordingly, there are a larger number of options in the connecting process, such as laser welding other than TIG welding and plasma welding, and brazing and soldering. As the coil height in the axial direction becomes stable, the connecting process in the later stage becomes easier, and productivity becomes higher. Thus, a junction area can be maintained in a stable manner.

Further, as the positional relationships between the coils prior to the welding becomes stable, the detachment length can be shortened.

Instead of the slits 900, recesses may be formed. The slits 900 are formed by slitting the enamel coating. However, the enamel coating may not be slit but be recessed depending on the insulating spatial distance. The conductor portions from which the insulating coating has been detached may be recessed depending on the height of the welding-side coil end 62.

It should be noted that, in a case where the slits 900 are formed in the insulating coating, the insulating coating may be slit at such a small depth that the conductor inside the insulating coating is not exposed. However, the slits 900 may be formed so as to satisfy T2<T1, where T1 represents the depth of the slits 900, and T2 represents the thickness of the insulating coating. In other words, the slits 900 may be formed so as to reach the conductor inside the insulating coating.

With this structure, the positional relationship between the coils after the shaping becomes stable, and a stable insulation distance can be achieved. Thus, a rotating electric machine that has insulation properties necessary in electric vehicles and hybrid electric vehicles can be obtained.

In the above description, a rotating electric machine of a permanent magnet type has been explained. However, a feature of the present invention relate to coil ends of a stator. Therefore, it is possible to use a rotor of an induction type, a synchronous reluctance type, a claw pole type, or the like, instead of a rotor of a permanent magnet type. Also, the coil winding type is a wave winding type. However, a coil winding type with features similar to those of a wave winding type can also be used. An inward rotation type is next described, but an outward rotation type can also be used.

Figure 15:
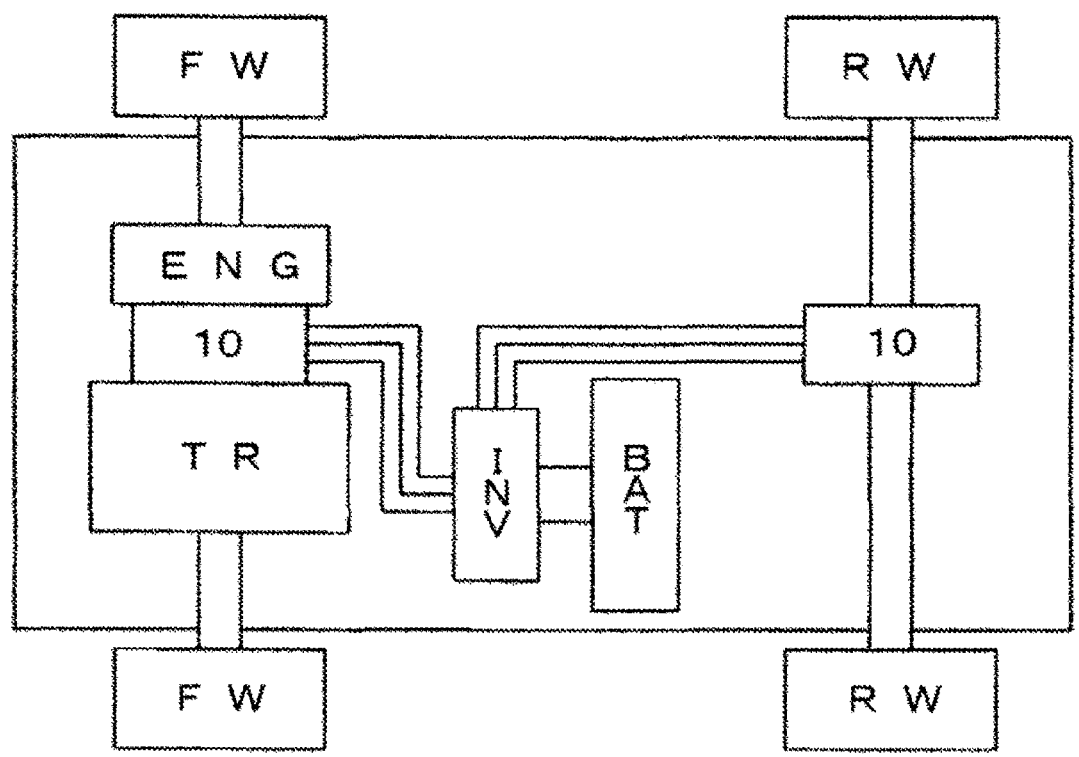
FIG. 15 is a block diagram showing the configuration of a vehicle in which rotating electric machines are mounted.

Referring now to FIG. 15, the configuration of a vehicle in which rotating electric machines 10 according to this embodiment are mounted is described. FIG. 15 shows the power train of a four-wheel-drive hybrid vehicle. The principal power supplies on the front side are an engine ENG and a rotating electric machine 10. The power generated by the engine ENG and the rotating electric machine 10 is subjected to gear shifting by a transmission TR, and thus, power is transmitted to the front-side drive wheels FW. Meanwhile, when the rear wheels are driven, a rotating electric machine 10 provided on the rear side is mechanically connected to rear-side drive wheels RW, and thus, power is transmitted.

The rotating electric machines 10 activate the engine, and, in accordance with a running condition of the vehicle, switch between generation of a driving force and generation of power collected as electric energy from the energy at a time when the vehicle slows down. Driving and power generating operations of the rotating electric machines 10 are controlled by a power inverter INV so that the torque and the number of revolutions are optimized in accordance with a driving situation of the vehicle. The power necessary for driving the rotating electric machines 10 is supplied from a battery BAT via the power inverter INV. When the rotating electric machines 10 are in power generating operations, the battery BAT is charged with electric energy via the power inverter INV.

Here, the rotating electric machine 10 as the power source on the front side is provided between the engine ENG and the transmission TR, and has the above described structure. As for the rotating electric machine 10 as the drive power source on the rear side, the same rotating electric machine as that on the front side may be used, or some other rotating electric machine having a conventional structure may be used. This is also applicable to a hybrid vehicle that is not of a four-wheel-drive type.

As described above, the present invention can provide a stator for a rotating electric machine that has excellent insulation properties, despite being small in size and being of a high-output type.

It should be noted that the present invention is not limited to the above described embodiment, and includes various modifications. For example, the above described embodiment has been described in detail for ease of understanding of the present invention, and the present invention is not limited to a structure that includes all the components described above. Also, it is possible to add a component to the embodiment, delete one of the components of the embodiment, or replace one of the components of the embodiment with some other component.

Although rotating electric machines for electric vehicles and hybrid electric vehicles have been described as an example of application of the present invention, the present invention can also be applied to industrial motors for elevators and the like and motors for household appliances such as air-conditioner compressors, as well as auxiliary motors for automobiles, such as alternators, starter generators (including motor generators), electric compressors, and electric pumps.

REFERENCE SIGNS LIST

10 Rotating electric machine
11 Rotor
12 Rotor core
13 Shaft
18 Permanent magnet
20 Stator
26 Coil
28 Segment coil
28C Vertex
28E End portion
28F Diagonal conductor portion
40 Neutral-point connecting conductor
42U AC terminal
42V AC terminal
42W AC terminal
50 Housing
60 Stator coil
61 Non-welding-side coil end
62 welding-side coil end
130 Liquid-cooled jacket
132 Stator core
133 Electromagnetic steel sheet
138 Stator coil
140 Coil end
144, 145 Bearing
150 Storage space
154, 155 Refrigerant path
156 Magnetic void
160 Auxiliary magnetic pole
200 Welded portion
210 Weld groove
300 Insulating paper
310 Slot liner
420 Slot
430 Teeth
440 Core back
800 Connecting portion
810 Magnet insertion hole
900 Slit

The invention claimed is:

1. A stator coil inserted into a slot in a stator of a rotating electric machine,
the stator coil being formed with a plurality of segment coils, the segment coils being connected to one another,
wherein
the segment coils each include an insulating coated portion coated with an insulating coating, the segment coils each include an uncoated portion that is not coated with the insulating coating, and one of a slit and a recess is formed in the insulating coating of the insulating coated portion of each segment coil at a coil end.

2. The stator coil according to claim 1, wherein the one of the slit and the recess is formed between a diagonal conductor portion and a conductor-end straight portion of each segment coil.

3. The stator coil according to claim 2, wherein the one of the slit and the recess is formed in a face of each segment coil on an end portion side in an axial direction.

4. The stator coil according to claim 3, wherein each segment coil is rectangular in cross-section.

5. The stator coil according to claim 4, wherein $T2<T1$, where $T1$ represents a depth of the slit, and $T2$ represents a thickness of the insulating coating.

6. A stator comprising:

the stator coil according to claim 1; and a stator core including a slot into which the stator coil is inserted.

7. A rotating electric machine comprising:

the stator according to claim 6; and a rotor facing the stator via a void.

8. The stator coil according to claim 1, wherein for each segment coil, the one of the slit or the recess is disposed in a range of 1 to 2 millimeters (mm) away from the uncoated portion.

9. The stator coil according to claim 1, wherein the one of the slit or the recess is configured to engage with a hook portion.

* * * * *